United States Patent [19]

Asada et al.

[11] Patent Number: 4,557,610
[45] Date of Patent: Dec. 10, 1985

[54] DYNAMIC PRESSURE TYPE FLUID BEARING DEVICE

[75] Inventors: Takafumi Asada, Hirakata; Toshio Onishi, Okayama; Kajuyoshi Senma, Hirakata; Hideo Matsumoto, Osaka, all of Japan

[73] Assignee: Matsushita Electric Industrial Co., Ltd., Osaka, Japan

[21] Appl. No.: 609,079

[22] PCT Filed: Sep. 2, 1983

[86] PCT No.: PCT/JP83/00292
§ 371 Date: May 1, 1984
§ 102(e) Date: May 1, 1984

[87] PCT Pub. No.: WO84/01006
PCT Pub. Date: Mar. 15, 1984

[30] Foreign Application Priority Data

Sep. 2, 1982 [JP] Japan .................. 57-153005
Dec. 10, 1982 [JP] Japan .................. 57-217207

[51] Int. Cl.⁴ .............................................. F16C 17/10
[52] U.S. Cl. ...................................... 384/107; 384/113
[58] Field of Search .......... 384/99, 100, 107, 111–115, 384/118, 121, 123, 322, 368, 371, 397, 398

[56] References Cited

U.S. PATENT DOCUMENTS 3,718,379 2/1973 Williams et al. .................. 384/113
3,758,177 9/1973 Williams .......................... 384/113

FOREIGN PATENT DOCUMENTS 160421 12/1981 Japan .
4821 1/1983 Japan .

*Primary Examiner*—Stuart S. Levy
*Assistant Examiner*—David Werner
*Attorney, Agent, or Firm*—Wenderoth, Lind & Ponack

[57] ABSTRACT

A dynamic pressure type fluid bearing device including a housing having a bearing hole, a shaft rotatably provided in this bearing hole, and a thrust bearing member attached to an end of the housing, wherein a groove is provided in either the shaft or the bearing hole, another groove is provided in the contacting surface between the thrust bearing member and the shaft, a ventilation flute to communicate with the atmosphere is provided in the contacting surface between the thrust bearing member and the housing, and a lubricant is charged around the groove, so that the lubricant is prevented from flowing out due to changes in the atmospheric pressure or environment.

4 Claims, 8 Drawing Figures

DYNAMIC PRESSURE TYPE FLUID BEARING DEVICE

FIELD OF THE INVENTION

This invention relates to a dynamic pressure type fluid bearing device, and is to present a dynamic pressure type fluid bearing device which is usable under both high pressure and low pressure, can be manufactured by a simple process, and is low in cost.

DESCRIPTION OF THE PRIOR ART

In a conventional dynamic pressure type fluid bearing device (hereinafter briefly called a fluid bearing device), as shown in FIGS. 1 and 2, a bearing hole 1a is provided at high precision in a housing 1, and a thrust bearing member 2 is fitted at a right angle to the hole in the lower part of the housing, and a shaft 3 is rotatably provided in the hole 1a in the housing 1. Grooves 3d are processed in the shaft 3 by etching or other process, and are filled with an oil or grease lubricant 4a. On the other hand, in the top of the thrust bearing member 2 on the confronting side, grooves 2a as shown in FIG. 2 are formed, and the grooves 2a, 3d are filled with lubricants 4a and 4b and thereby constituting a fluid bearing in the radial and thrust directions. Air or other gas 5 is left over inside the bearing enclosed at this time. In this state, when the shaft 3 or housing 1 is rotated by a motor (not shown), a pressure is built up by the pumping action of the grooves 2a and 3d, so that the rotation is effected without contact.

With this construction, however, when the bearing device is used in a state of low pressure, such as on the top of a high mountain and in the outer space, the gas 5 expands under reduced pressure, and the lubricant 4a in the radial groove 1a is forced out upward. What is more, when this conventional bearing device is being used in a horizontal position, the lubricant 4a flows out of the bearing unit, and a lubricant shortage occurs in the bearing, which may give rise to seizure. Similarly, when this bearing is used under high pressure, the gas 5 contracts at elevated pressure, and the lubricant 4a in the radial bearing is pushed in downward, and a lubricant shortage occurs in the radial groove 3d, which may also give rise to seizure. These defects at low or high pressure may occur, if the enclosed bearing is uniformly filled with lubricant without any gas 5, as far as tiny air bubbles are contained in the lubricants 4a and 4b. For instance, air bubbles in the lubricant 4b may expand under reduced pressure to force out the lubricant 4a from the radial bearing.

DISCLOSURE OF THE INVENTION

The present invention provides the advantage of being usable under both high pressure and low pressure by comprising a housing having a bearing hole, a shaft rotatably provided in the bearing hole, grooves for building up a force in the radial direction provided in the shaft or housing, a thrust bearing member having grooves to build up a force in the thrust direction attached to the end of the shaft, shallow ventilation flutes provided in the junction plane against the housing of this thrust bearing member, and lubricants charged into both grooves.

DESCRIPTION OF THE PREFERRED EMBODIMENTS

Figure 1:
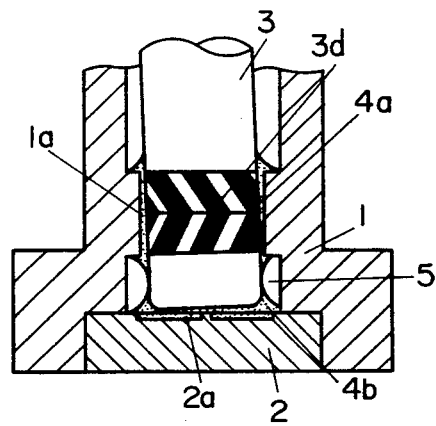
FIG. 1 is a sectional view of a conventional fluid bearing device.
Figure 2:
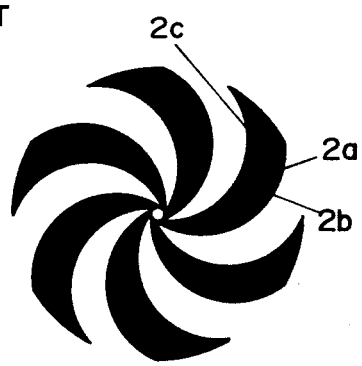
FIG. 2 describes the groove profile of the thrust bearing unit of the same.
Figure 3:
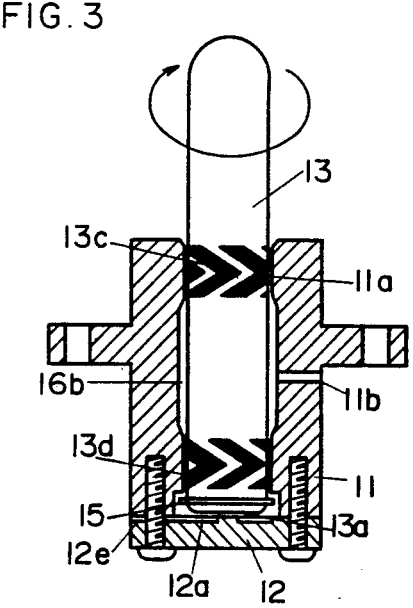
FIG. 3 is a sectional view of a fluid bearing device according to one of the embodiments of the present invention.
Figure 4:
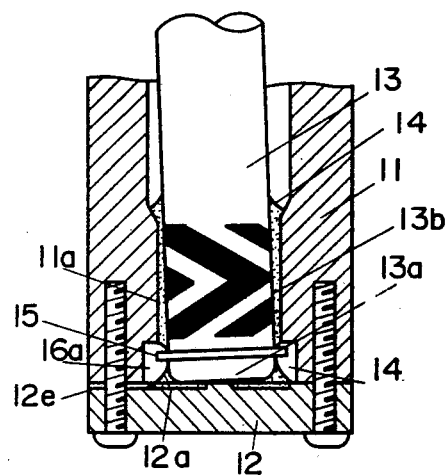
FIG. 4 is a magnified sectional view of an important part of the same device.

One of the embodiments of the present invention is described below with reference to FIGS. 3 to 6. In these drawings, numeral 11 denotes a housing, in which is provided a hole 11a serving as a bearing, and a shaft 13, in which are provided grooves 13c and 13d for radial fluid bearing by etching or other process, is rotatably provided in hole 11a. A lower end plane 13a of shaft 13 is finished in a smooth plane therein with high precision. Beneath this shaft is provided a stopper ring 15. A thrust bearing member 12 is secured to the housing 11 confronting the lower end plane 13a of the shaft 13. The upper side surface of the thrust bearing member 12 is processed at high precision by grinding or other processing, and grooves 12a are processed in its center by etching or other processing. These three grooves, including the radial grooves 13c and 13d are filled with a lubricant 14, and when either the shaft 13 or the housing 1 is rotated by a motor (not shown) at a constant speed, a pressure is built up by the pumping action of grooves 12a, 13c and 13d, so that the rotation may be effected without contact. A ventilation flute 12e is provided above the thrust bearing member 12, and is positioned at the same level as the contacting surface with the housing, that is, the groove 12a. The ventilation flute 12e provides communication between the air or gas 16a entrapped in the bearing and the atmosphere to eliminate the pressure difference, that is, under reduced pressure, forces out the internal gas 16a, or, under elevated pressure, takes in the fresh air, thereby preventing the lubricant from flowing out both at high pressure and at low pressure, so that the surface tension and viscosity of the lubricant are maintained in the grooves 12a and 13c, 13d. As a result, the same performance as experienced under ordinary pressure may be obtained.

If, then, tiny air bubbles are contained in the lubricant 14, in an ordinary dynamic pressure type fluid bearing, when the shaft 13 or housing 11 begins to rotate, the lubricant 14 with higher density is more forcefully pumped toward the center of the grooves than the air bubbles of smaller density by the pumping action of the grooves 12a and 13b, so that the lubricant 14 is sent into the central part while the bubbles are forced out of the grooves. These expelled bubbles are similarly brought out of the bearing through the ventilation flute 12e. Thus, a stable rotation is obtained in the bearing.

In addition, by providing the shallow ventilation flute 12e in the contacting plane against the sleeve 11 of the thrust bearing member 12, entry of foreign matter from outside is far less than the method of providing a ventilation hole by drilling a hole of about 1 millimeter in diameter, for instance, in the thrust bearing member 12 parallel to the shaft 13.

Figure 5:
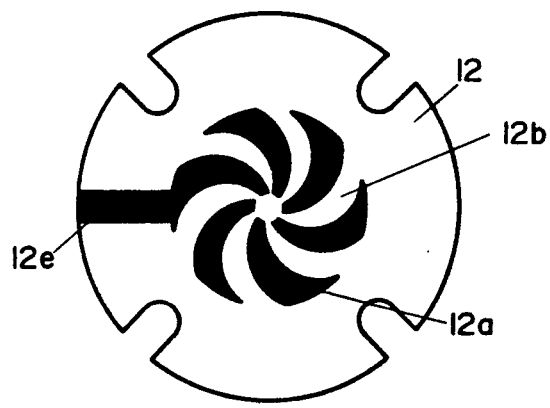
FIG. 5 is a plan view of the thrust bearing member of the same.

The ventilation flute 12e may be processed by etching or other method as shown in FIG. 5 simultaneously with the groove 12a in the thrust bearing member 12. Thus, by an etching process, a shallow flute of about 3 to 10 microns in depth may be processed, which is not only excellent in tightness providing against the entry of dust, but also lower in cost because of simultaneous processing. A modified example of thrust bearing member 12 is shown in FIG. 6.

Figure 6:
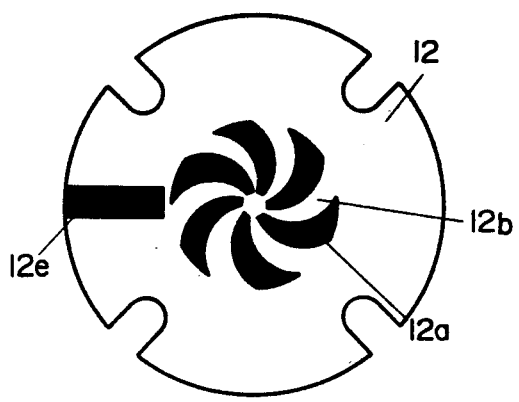
FIG. 6 is a plan view of a modified example of the same thrust bearing member.

When a certain depth is required in the ventilation flute, it is possible to provide the same by simultaneous blanking and press coining of the thrust bearing member 12 as shown in FIG. 6, by means of a press. In this case also, the cost is reduced by the simultaneous processing. Incidentally, numeral 11b denotes a ventilation hole for providing communication between the air or gas contained between the grooves 13c and 13d of the shaft 13 and the atmosphere in order to prevent the lubricant 14 from spilling, and its diameter is extromely small in order to prevent entry of foreign matter.

Figure 7:
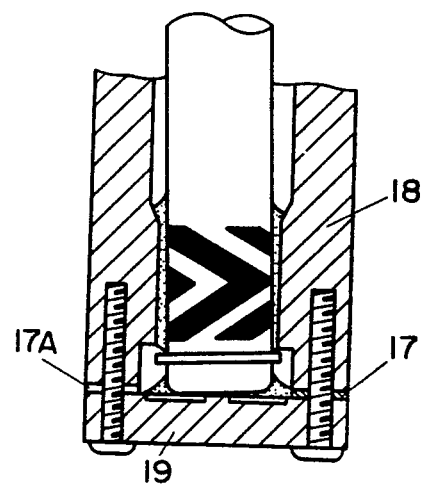
FIG. 7 is a magnified sectional view of an important part of a second embodiment.
Figure 8:
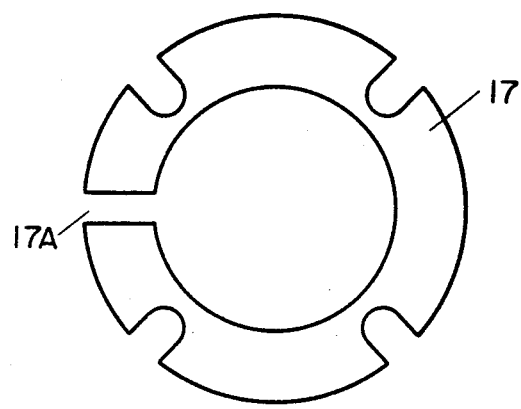
FIG. 8 is a magnified view of a thin plate of the same.

A second embodiment is shown in FIGS. 7 and 8. In this case, as shown in FIG. 7, the ventilation is achieved by inserting a thin annular plate 17 having a ventilation flute 17A as shown in FIG. 8 between the sleeve 18 and thrust bearing member 19 in FIG. 7, while the other parts are same as in the first embodiment.

Accordingly, the present invention provides a dynamic pressure type fluid bearing the performance of which may be fully exhibited at both high pressure and low pressure by providing a ventilation flute in the thrust bearing member, and its effect is enormous inindustrial use.

What is claimed is:

1. A dynamic pressure type fluid bearing device comprising:
    a housing having a first end and a second end, and having an inner surface defining a bearing hole extending from said first end toward said second end;
    a shaft having a central axis, an outer surface surrounding said axis opposing said inner surface, and an end surface at said second end, rotatably disposed in said bearing hole; and
    a thrust bearing member attached to said second end of said housing, having a thrust bearing surface opposing said end surface of said shaft;
    one of said inner surface and said outer surface having first grooves filled with nongaseous lubricant and defining means for creating dynamic pressure in the nongaseous lubricant therein radially with respect to said axis;
    said thrust bearing surface having second grooves filled with nongaseous lubricant and defining means for creating dynamic pressure in the nongaseous lubricant therein parallel said axis; said device further comprising means, having a third groove at said second end, extending radially with respect to said axis, between said thrust bearing member and said housing, for providing communication between said bearing hole and the exterior of said device through said third groove, whereby said bearing hole communicates with the outside atmosphere through said third groove and the nongaseous lubricant filling said first and second grooves;
    said housing, said shaft and said thrust bearing member bounding a free space between said third groove and said first and second grooves, whereby said space is maintained at atmospheric pressure.

2. A dynamic pressure type fluid bearing device as in claim 1, wherein said third groove is etched into said thrust bearing surface.

3. A dynamic pressure type fluid bearing device as in claim 1, wherein said third groove is pressed into said thrust bearing surface.

4. A dynamic pressure type fluid bearing device comprising:
    a housing having a first end and a second end, and having an inner surface defining a bearing hole extending from said first end toward said second end;
    a shaft having a central axis, an outer surface surrounding said axis opposing said inner surface, and an end surface at said second end;
    a thrust bearing member attached to said second end of said housing, having a thrust bearing surface opposing said end surface of said shaft; and
    a thin annular plate disposed between said housing and said thrust bearing member;
    one of said inner surface and said outer surface having first grooves filled with nongaseous lubricant and defining means for creating dynamic pressure in the nongaseous lubricant therein radially with respect to said axis;
    said thrust bearing surface having second grooves filled with nongaseous lubricant and defining means for creating dynamic pressure in the nongaseous lubricant therein parallel said axis;
    said plate having a third groove therein defining means for providing communication between said bearing hole and the exterior of said device through said third groove, whereby said bearing hole communicates with the outside atmosphere through said third groove and the nongaseous lubricant filling said first and second grooves;
    said housing, said shaft and said thrust bearing member bounding a free space between said third groove and said first and second grooves, whereby said space is maintained at atmospheric pressure.

* * * * *